May 25, 1926.
L. D. JONES
1,586,449
PROCESS AND APPARATUS FOR THE SEPARATION OF IMMISCIBLE SUBSTANCES
Filed May 1, 1924
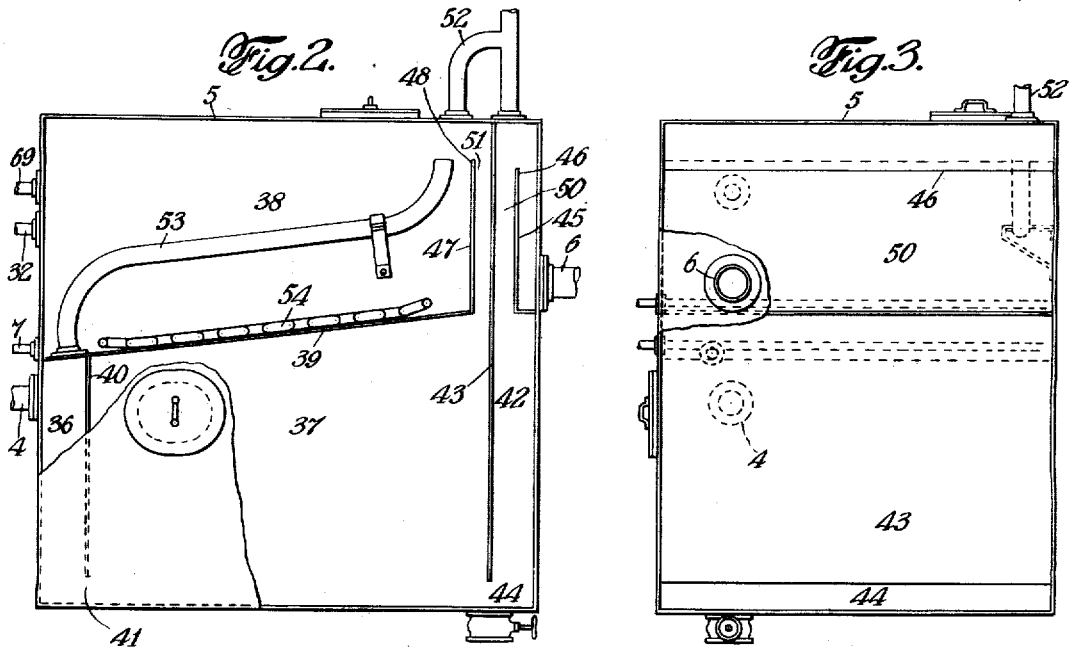
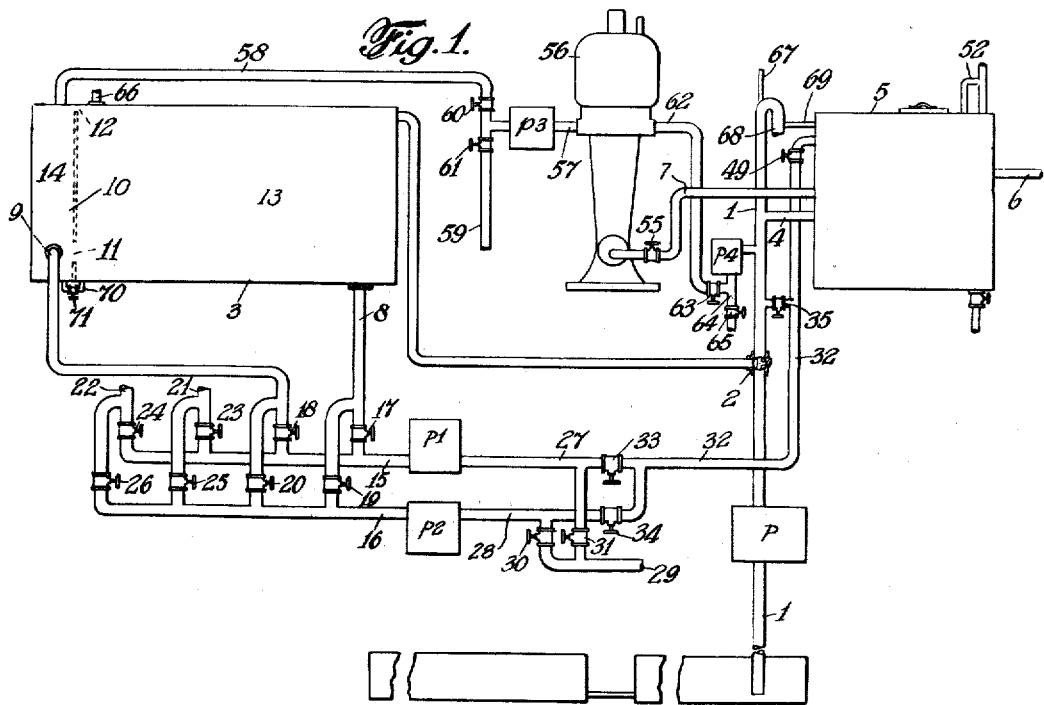
INVENTOR
Leo D. Jones
BY
Kenyon & Kenyon
ATTORNEYS Patented May 25, 1926.

1,586,449

UNITED STATES PATENT OFFICE.

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE.

PROCESS AND APPARATUS FOR THE SEPARATION OF IMMISCIBLE SUBSTANCES.

Application filed May 1, 1924. Serial No. 710,390.

My invention relates to processes and apparatus for the separation of immiscible substances, a special application of my invention being the recovery of oil from water with which it is mixed and the elimination from oil of water that is mixed therewith.

Processes and apparatus that are suitable for freeing one substance from an immiscible substance to a substantially high degree may be more economically or more effectively used or applied when one of the substances is present in a relatively small proportion; and it is frequently possible to use simple processes and apparatus to produce a mixture of such proportions, even though the original mixture contained a predominating proportion of that substance which it is desired to have present in only a small proportion. For example, in accordance with my invention, I propose to employ a centrifugal separator for separating water from oil, but since it is possible that the original mixture may contain a very large proportion of water I propose to use auxiliary devices to so reduce the amount of water present that it constitutes but a small part of the mixture introduced into the centrifugal separator.

Water that has become mixed or even emulsified with oil should in many cases be removed from the oil before the oil is used. And when oil is stored on shipboard it frequently becomes mixed with sea water, for example, when the oil so stored is carried in compartments some of which are in the double bottom of the ship as in the case of fuel oil. When such oil compartments are emptied they are sometimes filled with sea water to ballast the ship and there is usually some water in such compartments when the oil is introduced. Furthermore such compartments are not entirely free of oil when the ballast water is introduced. In other ways oil and water become mixed in the operation of the ship and the water in the bilges frequently contains a considerable quantity of oil.

As the oil drawn from the storage tanks of ships may contain mixed or emulsified water it has been customary to provide two tanks that are filled from storage, the contents of one tank being consumed while the contents of the other tank settles. These tanks that are intermediate the storage compartments and the burners of the ship are called daily run or daily service tanks. In such intermediate tanks water and emulsion settle and accumulate from day to day and it has been customary to discharge such settlings into the sea in order that oil going to the burners will not be contaminated thereby.

Under these conditions several problems arise. The oil drawn from the fuel storage tanks must be substantially freed of mixed and emulsified water before it can be burned. The oil in the bilge and ballast water must be recovered as a matter of economy and, since such water and in particular the ballast water, is preferably discharged while the ship is in a harbor, the oil in such water must be recovered to avoid a breach of laws prohibiting the pollution of harbors and beaches thereby.

It is an object of my invention to provide a process and apparatus for the separation of immiscible substances, a particular object being the provision of such a process and apparatus, whereby water may be separated from oil to make it useful for burning and oil may be separated from water to save the oil and prevent harbor pollution.

A specific object of my invention is to provide a process for the separation of immiscible substances and to provide apparatus for carrying out such a process wherein an effective gravity separating device and a centrifugal separating device are so interrelated as to produce rapid and effective separation of the immiscible substances. And in accordance with my invention I propose to employ and provide a gravity separating device and a centrifugal separating device so related to one another and to the ordinary equipment of oil burning ships that oil supplied to the burners will be effectively freed of water and no oil will be lost and no oil will be contained in the water discharged from the ship to constitute a loss or effect such pollution. It was formerly the practice to discharge overboard water, oil and emulsion that collected in the settling or daily service tank as well as the oil mixed with water ballast, but the application of my process and the use of apparatus embodying my invention will eliminate this loss and cause of pollution.

As the recovery and purification of oil coming from the storage tanks of ships constitutes one application of my invention, I shall describe such application merely for the purpose of disclosing my invention, but not with the intention of limiting my invention to such application.

In the drawings,

Fig. 1 is a diagram of apparatus embodying my invention and whereby my process may be practiced;

Fig. 2 is a vertical elevation, partly in section, of a gravity purifying device, shown in Fig. 1, and embodying and for the practice of an important part of my invention; and Fig. 3 is a view taken from the right of Fig. 2 with the front wall of the device partly broken away. The supply pipe 1 may lead from any container of a mixture of immiscible substances such as the storage tanks for the ship fuel oil. The pump P upon proper setting of the three-way valve 2 will deliver the mixture to an intermediate or settling or daily service tank 3. Or with a different setting of the three-way valve 2, the mixture is delivered through the pipe 4 into the gravity settling device 5 from which one substance is discharged through the pipe 6, and another substance is discharged through the pipe 7. When oil carried in a ship. e. g. fuel oil, or water contaminated with oil, e. g. ballast or bilge water, is being handled, water will be discharged, preferably into the sea, through the pipe 6 and oil will be discharged through the pipe 7. Although two settling or service tanks would ordinarily be employed from either of which fuel may be passed through suitable outlets to consumption apparatus, particularly in the handling of ship fuel, only one is shown in the drawing. Each settling or service tank 3 is provided with an outlet 8 near the bottom and an outlet 9 from a higher point. In the embodiment herein shown, each service tank is divided by a partition 10 into a main compartment 13 and an auxiliary compartment 14. The partition 10 has a passage 11 at about the same level as the outlet 9 and a passage 12 to equalize the air pressure in the compartments 13 and 14. Two pumps P' and P² are provided and a manifold 15 is connected to the inlet of pump P' and a manifold 16 is connected to the inlet of pump P². The settling tank outlets 8 and 9 are respectively connected to the manifold 15 through the valves 17 and 18 and to the manifold 16 through the valves 19 and 20, as shown. Pipes 21 and 22 respectively lead from outlets of the other settling tank (not shown) that correspond to the outlets 8 and 9 of the tank 3 shown, communication between the pipes 21 and 22 with the manifolds 15 and 16 being controlled by the valves 23, 24, 25 and 26. The pumps P' and P² are respectively provided with outlets 27 and 28. The pipe 29 receives the desired substance that has been substantially freed of other substances of the original mixture. In the handling of ship fuel oil, oil effectively freed of water will be delivered through the pipe 29 to the burners. Pipe 29 is connected to the pipe 28 through the valve 30 and to the pipe 27 through the valve 31. After a mixture, for example, fuel oil and water, has settled in one of the tanks 3, oil may be drawn through the upper outlet 9 and passed to the burners by the pump P' if the valve 18 is open, or by the pump P² if the valve 20 is open. Any substance that has settled in the tank 3, for example, free water, emulsion, or oil and water that are merely mixed, may be withdrawn from the lower outlets 8 of the tank 3. It will be apparent from the connections and valves shown in the drawing that oil may be drawn from the upper outlet 9 of either of the tanks 3 by means of either of the pumps P' or P², and thereby passed to the burner. Only one pump will ordinarily be so used and it will be apparent that the pump that is not so used may be employed to withdraw material from the lower outlet 8 of either of the tanks 3 and pass it to the pipe 32. If the pump P' is withdrawing material from one of the outlets 8 the valves 33 and 30 will be open and the valves 34 and 31 will be closed. If the pump P² is withdrawing material from one of the outlets 8, the valves 33 and 30 will be closed and the valves 34 and 31 will be open. If the material passing from the tank 3 through the outlet 8 is largely water, the valve 35 is opened and the substance from the pipe 32 will pass through the valve 35 and the pipe 4 into the gravity separating device 5.

A mixture of immiscible substances entering the gravity separator 5, through the pipe 4, such as ballast water from the storage tanks that contains a small quantity of oil, or oil from the storage tanks that contains water, or material coming from one of the outlets 8 and containing water, mixed oil and water, or an emulsion, will pass into the inlet chamber 36, and be carried to the bottom of the gravity settling device 5. The gravity settling tank comprises a closed tank that is divided into a separating compartment 37 and a collecting compartment 38 by a partition 39, preferably inclined as shown. The inlet compartment 36 is formed by the partition 40 that extends from the partition 39 to a point near the bottom of the tank leaving a passage 41 between the inlet compartment 36 and the separating compartment 37. An outlet compartment 42 is formed by a partition 43 that extends from the top of the tank 5 to a point near the bottom leaving an outlet passage 44 between the separating compartment 37 and the outlet compartment 42. In the outlet compartment 42 a partition 45 has at its top a weir 46 that controls the flow of liquid to the discharge pipe 6. A partition 47 extending up from the partition 39 has at its top a weir 48 that controls the flow of a lighter constituent of the mixture, which is oil when ship fuel is being handled, into the collecting compartment 38. The weirs 46 and 48 will be at different levels as and for the purpose hereinafter described; and the weirs 46 and 48 as well as the edges of the partitions 40 and 43 that respectively provide the passages 41 and 44 should be of sufficient length to provide for a considerable flow with a minimum of crest over the weirs 46 and 48 and with a minimum of turbulence through the passages 41 and 44. The effect of the motion of the ship when fuel oil is being handled in the gravity settling device 5 is reduced to a minimum by the fact that the weirs 46 and 48 are positioned close together and have considerable length. The passage 50 that leads to the weir 46 and the passage 51 that leads to the weir 48 are made narrow in order that even a large change of position of the separator 5 with respect to the horizontal, due to motion of the ship, will have but little effect upon the level of liquid in the passages 50 and 51. And as the passages 50 and 51, and the weirs 46 and 48 that respectively control the flow from those passages, are positioned close together changes in the horizontal position of the separator 5 will have a minimum effect upon the relative levels of liquid in the passages 50 and 51. Air pressure on opposite sides of the partition 43 is equalized by the vent 52.

A mixture of liquids that enters the inlet compartment 36 through the pipe 4 will be conducted to the bottom of the tank and passing through the long opening 41 will be distributed over the bottom of the separating compartment 37 without stirring up the liquid in that compartment. Compartment 37 will contain a large body of liquid in a substantially quiescent state. The substantially quiescent body of liquid will comprise a mixture of lighter and heavier substances, e. g. water and oil or emulsion, in which lighter substances are rising, and the division line between the lighter substances and the heavier substance or the mixture will be part way up the passage 51. As the introduced liquid passes from the bottom edge of the partition 40 to the outlet 44 the lighter substance rises within the compartment 37 and the heavier substance, so freed of the lighter substance, flows upward in the outlet compartment 42 and passes over the weir 46. When a mixture of oil and water is being handled the weir 46 is at such level that the column of water between the lower edge of the partition 43 and the weir 46 will hydrostatically balance the column of liquid between the lower edge of the partition 43 and weir 48, the lower portion of this column of liquid being water containing oil and the upper portion being oil that has been largely freed of water. When oil is to be passed over the weir 48 that weir is higher than the weir 46. If the mixture entering the inlet compartment 36 is composed largely of the lighter substance of the mixture such lighter substance will rise in the pipe 53, of which the outlet is on the same level as the weir 48, and be discharged into the collecting compartment 38. Thus oil or oily substances entering the separator 5 through the pipe 4 will accumulate in the collecting compartment 38; and if the settlings or other accumulations in the intermediate or service tanks 3 that are withdrawn through the outlets 8 and passed to the pipe 32 consist largely of oil or oily substances, such substances may be passed directly to the collecting compartment 38 by opening the valve 49 and closing the valve 35, or through pipe 53.

The collecting compartment 38 contains heating coils 54 for heating the oil and oily substances that accumulate in the compartment 38 and these coils being positioned close to the partition 39 will transmit heat to the oil or oily substances passing along the under side of that sloping partition toward the oil passage 51.

The oil or oily substances in the collecting compartment 38 that are either substantially free of water or contain water in a much reduced proportion, are rendered more fluid through being heated and such substances are discharged from the separator 5 through the pipe 7 provided with the valve 55 and leading to the inlet of the centrifuge 56. The centrifuge may be of any type but I prefer to employ that type of centrifuge disclosed in an application filed jointly by myself and Arthur U. Ayres on May 1st, 1924 Serial No. 710,388 in order to prevent evaporation of the substances being separated and pollution of the atmosphere. The centrifuge 56 will eliminate free water and at least a large proportion of any emulsified water and oil will pass therefrom through the pipe 57 to the pump $P^3$ which passes the oil by means of the pipe 58 to the auxiliary compartment 14 of an intermediate or settling tank 3 or by means of the pipe 59 to the oil storage tanks, the direction of flow being determined by the valve 60 in the pipe 58 and the valve 61 in the pipe 59. If the centrifugal is of the type that continuously discharges the heavier substance, the water will pass therefrom by means of the pipe 62 that leads through the valve 63 to the pipe 64 which in turn leads from the bilges of the ship through the valve 65 to the pump P⁴ that discharges into the pipe 1 from which liquid is led by the pipe 4 to the separator 5.

Settling or intermediate or service tanks will ordinarily be provided with a vent 66 and pipe 1 leading from the storage tanks will have a vent 67 and a return 68 that leads back to the storage tanks and into which an overflow 69 leads from the separator 5. The pipe 1 being provided with the vent 67 is thereby constituted a chamber wherein gas, such as air, is permitted to escape from mixture that is pumped from the storage tanks to the gravity separator 5. The mixture, passing through the pipe 4 into the separator 5, being thus relieved of gas, the balanced columns of liquid on opposite sides of partition 43 and in pipe 53 will properly control the discharge of oil and water from the separator. If those columns of liquid contained air bubbles, particularly varying proportions of air bubbles, the resulting variation in density of the liquids in the two balanced columns might be great enough to interfere with the discharge of the separated liquids in proper proportion. Accordingly the mixture that is to be separated in the gravity separator is preliminarily freed of air in order that the discharge from the separator of the separated substances may be effectively controlled by liquid balance. The means whereby the substances or the mixture may be relieved of air may obviously be constructed in various ways. Although in the apparatus shown this means conveniently takes the form of a vented pipe or chamber whereby gas escapes from the liquid, the use of various devices whereby liquid is otherwise sufficiently freed of gas falls within the spirit of my invention. In the apparatus shown the liquid in the pipe 1 is subject to the effect of the balancing columns and the pipe or chamber 1 must therefore extend to a level higher than weirs 46 and 48. Obviously, as shown, the mixture passage between the pipe 1 and the gravity separator should be at a level below the line of division between the oil and water in the passage 51 as it is not desirable to have the mixture passing downward through oil at any point. Furthermore, in some embodiments of my invention, the mixture that is being freed of air need not be subject to the liquid balance that is maintained within the gravity separator.

From the foregoing it will be apparent that I have provided a process and apparatus for the practice thereof whereby immiscible substances contained in a storage tank as well as settlings in an intermediate or service tank may be treated to recover a substance that may properly be brought together with the desired substance that is being withdrawn from the service tank. And it will also be apparent that I have provided a process and apparatus whereby substances may be separated by maintaining a substantially quiescent body of a mixture of substances that is constantly, but without the production of turbulence, fed with a mixture of substances and from which a lighter substance is withdrawn at an upper level and a heavier substance is withdrawn from a lower level, such withdrawal being determined by hydrostatic balance, such hydrostatic balance being controlled by weirs so close together and at the outlet of passages so small, that changes in the horizontal position of the separator will have little or no effect upon the separating action. And it will be apparent that when my process and apparatus are applied to the handling of ship fuel oil, all water, whether from bilges or ballast tanks, is freed of contaminating oil before it is descharged overboard by leading all ordinary water discharges to a separator, the water outlet of which is the only overboard discharge, and that all oil or oily matter so recovered and all settlings of the daily service or daily run or intermediate tanks are effectively freed of the objectionable water and then brought together with the oil of the service tanks from which emulsion and water has settled and which is passing to the burners. In this connection it will be noted that oil from the centrifuge enters the compartment 14 from which oil flows by the outlet 9 to the burners and which is fed through the passage 11 with oil from which water and emulsion have settled. If oil entering through the pipe 58 contains any water, e. g. chemically combined water, that has not been eliminated by the centrifuge, the amount of such water will be so small as compared with the amount of water-free oil entering the compartment through the passage 11 and the pipe 58 that the efficiency of the burners will be substantially maintained. A pipe 70 controlled by a valve 71 may be provided to transfer settlings from the compartment 14 to the compartment 13 of a tank 3. Thus ballast water withdrawn from the storage tanks through the pipe 1 will be freed of oil in the separator 5, before it is discharged overboard, and oil or oily matter contained in the settlings in the service tanks will be recovered instead of being thrown overboard as heretofore.

What I claim and desire to secure by Letters Patent is:

1. In combination with a liquid compartment, an intermediate tank having a service outlet, a gravity separator, a centrifuge, means for passing liquid from said compartment to said separator or said intermediate tank, means for passing settlings from said intermediate tank to said separator, a pipe for conducting a recovered substance from said separator to said centrifuge, and means for bringing together a substance recovered in said centrifuge and a substance passing from said outlet.

2. In combination with a liquid compartment, an intermediate tank having a service outlet, a separator, pipes for conducting liquid from said compartment to said intermediate tank or said separator, a centrifuge for purifying a substance recovered from said liquid, and means for conducting settlings from said intermediate tank and a substance recovered in said separator to said centrifuge.

3. In combination with a liquid compartment, an intermediate tank having a service outlet, a gravity separator, a centrifuge, means for passing liquid from said compartment to said separator or said intermediate tank, means for passing settlings from said intermediate tank to said centrifuge, and means for bringing together a substance recovered in said centrifuge and a substance passing from said outlet.

4. In combination with a liquid compartment, an intermediate tank having a service outlet, a gravity separator, a centrifuge, means for passing liquid from said compartment to said intermediate tank, means for passing settlings from said intermediate tank to said separator, a pipe for conducting a substance recovered in said separator to said centrifuge, and means for bringing together a substance recovered in said centrifuge and a substance passing from said outlet.

5. In combination with a service tank, a gravity separator, a pipe for conducting settlings from said service tank to said separator, a centrifuge, a pipe for conducting to said centrifuge a supernatant product recovered in said separator and means for bringing together a substance recovered in said centrifuge and a substance passing to consumption from said service tank.

6. In combination with a liquid compartment, an intermediate tank having a service outlet, pipe connections between said compartment and tank, a centrifuge, means for conducting settlings from said intermediate tank to said centrifuge, and means for bringing together a substance recovered in said centrifuge and a substance passing to consumption from said outlet.

7. In combination with a settling tank having a service outlet, a centrifuge, means for conducting settlings from said tank to said centrifuge, and means for bringing together a substance recovered in said centrifuge and a substance in said settling tank and passing from said service outlet.

8. In combination with ship fuel storage tanks, a service tank, a separator for the treatment of oil-containing overboard discharge, means for passing liquid from said storage tanks to said service tank or said separator, an oil purifying centrifuge, means for conducting service-tank settlings and oily products from said separator to said centrifuge, and a pipe for conducting oil from said centrifuge to said service tank.

9. In combination with ship fuel storage tanks, a settling tank, means for passing liquid from said storage tanks to said settling tank, a separator, means for conducting settlings from said settling tank to said separator, a centrifuge, a pipe for conducting supernatant oily products recovered in said separator to said centrifuge, and means for conducting oil from said centrifuge to consumption.

10. In combination with a ship fuel service tank, a centrifuge, means for conducting settlings from a lower level of said tank to said centrifuge without admixture with other substances, said tank being divided into compartments communicating at a higher level, a pipe for conducting oil from said centrifuge to one of said compartments, and a pipe leading from the same compartment at substantially said higher level to consumption.

11. In combination with a ship fuel service tank, a centrifuge, means for conducting settlings from a lower level of said tank to said centrifuge, a pipe for conducting oil from said centrifuge without admixture with other substances to said tank, and a service pipe leading from a higher level of said service tank.

12. In combination a liquid compartment, an intermediate tank, a gravity separator, pipes for passing the contents of said compartment to said intermediate tank or said separator, a centrifuge, a pipe for conducting to said centrifuge a substance recovered in said gravity separator and a pipe for conducting to said intermediate tank a substance recovered in said centrifuge.

13. In combination with a liquid compartment, an intermediate tank having a service outlet, a gravity separator, a centrifuge, means for passing liquid from said compartment to said intermediate tank, means for passing settlings from said intermediate tank to said separator, and a pipe for conducting to said centrifuge a supernatant substance recovered in said separator.

14. In combination with a liquid compartment an intermediate tank having a service outlet, a gravity separator, a centrifuge, means for passing liquid from said compartment to said separator, means for passing to said centrifuge a supernatant substance recovered in said separator, and a pipe for conducting to said intermediate tank a substance recovered in said centrifuge.

15. In combination with a ship fuel storage tank, a settling tank, means for passing the contents of said storage tank to said settling tank, a gravity separator, means for conducting settlings from said settling tank to said separator, a centrifuge, a pipe for conducting to said centrifuge supernatant oily products recovered in said separator, and means for conducting oil from said centrifuge to said settling tank.

16. In combination with a liquid compartment, an intermediate tank having a service outlet, a gravity separator, a centrifuge, means for passing liquid from said compartment to said separator or to said intermediate tank, means for passing settlings from said intermediate tank to said separator or to said centrifuge, and means for bringing together a substance recovered in said centrifuge and a substance passing through said outlet.

17. In combination with a tank having a service outlet, a gravity separator, a centrifuge, means for conducting settlings from said service tank to said separator or to said centrifuge, means for conducting a substance recovered in said separator to said centrifuge, and means for bringing together a substance recovered in said centrifuge and a substance passing from said service tank.

18. In combination with a liquid compartment, an intermediate tank having a service outlet, a separator, a centrifuge, pipes for conducting liquid from said compartment to said intermediate tank or to said separator, means for conducting settlings from said intermediate tank to said separator, a pipe for conducting to said centrifuge a substance recovered in said separator, and a pipe for passing to said intermediate tank a substance recovered in said centrifuge.

19. In combination with ship fuel storage tanks, a gravity separator for the treatment of oil-contaminated overboard discharge, means for passing fluid from said storage tanks to said separator, an oil purifying centrifuge and means for conducting to said centrifuge oily products recovered in said separator.

20. In combination with a liquid compartment, an intermediate tank having a service outlet, a gravity separator, a centrifuge, means for passing liquid from said compartment to said separator or to said intermediate tank, means for passing settlings from said intermediate tank to said separator or to said centrifuge, a pipe for conducting to said centrifuge a substance recovered in said separator, and means for bringing together a substance recovered in said centrifuge and a substance passing through said outlet.

21. In combination with ship fuel storage tanks, a gravity separator for the treatment of oil-containing overboard discharge, means for passing liquid from a ship fuel storage tank to said separator, an oil purifying centrifuge, a pipe for conducting to said centrifuge supernatant oily products recovered in said separator, and an overflow for conducting oily products recovered in said separator to a fuel storage tank.

22. In combination with ship fuel storage tanks, a plurality of intermediate tanks, means for passing liquid from said storage tanks to one of said intermediate tanks, a centrifuge, means for passing liquid from one of said intermediate tanks to said centrifuge, and a pipe for conducting oil recovered in said centrifuge directly to one of said intermediate tanks.

23. In combination with ship fuel storage tanks, a plurality of intermediate tanks, means for passing liquid from said storage tanks to one of said intermediate tanks, a centrifuge, means for passing the liquid contained in said last named intermediate tank to said centrifuge, and a separate pipe for conducting oil purified in said centrifuge directly to the other of said intermediate tanks, said last named intermediate tank having a service outlet.

24. The process of separating mixtures of water and oil or oily substances including emulsions on ships, which comprises withdrawing a body of the mixtures from storage or collecting compartments therefor, allowing said body of mixture to settle by gravity in a batch settling operation, withdrawing from said body and continuously separating by gravity the heavier product of said batch settling operation, centrifugally purifying the oil and oily substances recovered by said gravity separation, and bringing together the centrifugally purified oil and the lighter product of said batch settling operation.

25. The process of separating mixtures of water and oil or oily substances including emulsions on ships, which comprises withdrawing such mixture from storage or collecting compartments therefor and continuously separating by gravity into water and oil or oily substances the mixture so withdrawn, discharging overboard the separated water, centrifugally purifying the oil and oily substances recovered in said gravity separation, and bringing together the centrifugally purified oil and oil from storage.

26. The process of separating mixtures of water and oil or oily substances including emulsions on ships, which comprises withdrawing such mixture from storage or collecting compartments therefor and continuously separating by gravity into water and oil or oily substances the mixture so withdrawn, discharging overboard the separated water, and centrifugally purifying the supernatant oil and oily substances recovered in said gravity separation.

27. The process of separating mixtures of water and oil or oily substances including emulsions on ships, which comprises withdrawing such mixture from collecting or storage compartments therefor, continuously separating water by gravity from mixture containing a large proportion of water and batch settling mixture containing a relatively small proportion of water, centrifugally purifying oil and oily substances recovered in said gravity separation and contained in the settlings of said batch settling operation, and bringing together the centrifugally purified oil with the lighter product of said batch settling operation.

28. The process of separating mixtures of water and oil or oily substances including emulsions on ships, which comprises withdrawing a body of the mixtures from storage or collecting compartments therefor, allowing said body of mixture to settle by gravity in a batch settling operation, withdrawing from said body and centrifugally separating the heavier product of said settling operation, and bringing together prior to use thereof the lighter product of said centrifugal separating operation and the lighter product of said settling operation.

29. In apparatus for the separation of a mixture of immiscible substances, a gravity separator comprising compartments communicating at a lower level thereof and each having outlets provided with weirs at an upper level of said compartments and controlling the level of liquid therein, a chamber having an inlet for the mixture and a gas vent, and a mixture passage from said chamber to a lower level of one of said compartments.

30. In apparatus for the separation of a mixture of immiscible substances, a gravity separator comprising compartments communicating at a lower level thereof and provided with relatively restricted upwardly extending discharge passages respectively having weirs at upper levels thereof for controlling discharge of separated substances, and means for relieving of gas the mixture prior to introduction of the mixture into said separator.

In testimony whereof, I have signed my name to this specification.

LEO D. JONES.

storage compartments therefor, continuously separating water by gravity from mixture containing a large proportion of water and batch settling mixture containing a relatively small proportion of water, centrifugally purifying oil and oily substances recovered in said gravity separation and contained in the settlings of said batch settling operation, and bringing together the centrifugally purified oil with the lighter product of said batch settling operation.

28. The process of separating mixtures of water and oil or oily substances including emulsions on ships, which comprises withdrawing a body of the mixtures from storage or collecting compartments therefor, allowing said body of mixture to settle by gravity in a batch settling operation, withdrawing from said body and centrifugally separating the heavier product of said settling operation, and bringing together prior to use thereof the lighter product of said centrifugal separating operation and the lighter product of said settling operation.

29. In apparatus for the separation of a mixture of immiscible substances, a gravity separator comprising compartments communicating at a lower level thereof and each having outlets provided with weirs at an upper level of said compartments and controlling the level of liquid therein, a chamber having an inlet for the mixture and a gas vent, and a mixture passage from said chamber to a lower level of one of said compartments.

30. In apparatus for the separation of a mixture of immiscible substances, a gravity separator comprising compartments communicating at a lower level thereof and provided with relatively restricted upwardly extending discharge passages respectively having weirs at upper levels thereof for controlling discharge of separated substances, and means for relieving of gas the mixture prior to introduction of the mixture into said separator.

In testimony whereof, I have signed my name to this specification.

LEO D. JONES.

Certificate of Correction.

It is hereby certified that in Letters Patent No. 1,586,449, granted May 25, 1926, upon the application of Leo D. Jones, of Philadelphia, Pennsylvania, for an improvement in "Processes and Apparatus for the Separation of Immiscible Substances," an error appears in the printed specification requiring correction as follows: Page 5, lines 83 and 84, claim 10, strike out the words "without admixture with other substances"; and that the said Letters Patent should be read with this correction therein that the same may conform to the record of the case in the Patent Office.

Signed and sealed this 13th day of July, A. D. 1926.

[SEAL.]

M. J. MOORE,
*Acting Commissioner of Patents.*

Certificate of Correction.

It is hereby certified that in Letters Patent No. 1,586,449, granted May 25, 1926, upon the application of Leo D. Jones, of Philadelphia, Pennsylvania, for an improvement in "Processes and Apparatus for the Separation of Immiscible Substances," an error appears in the printed specification requiring correction as follows: Page 5, lines 83 and 84, claim 10, strike out the words " without admixture with other substances "; and that the said Letters Patent should be read with this correction therein that the same may conform to the record of the case in the Patent Office.

Signed and sealed this 13th day of July, A. D. 1926.

[SEAL.] M. J. MOORE,
*Acting Commissioner of Patents.*